United States Patent
Arnold et al.

(10) Patent No.: US 9,193,114 B2
(45) Date of Patent: Nov. 24, 2015

(54) METHOD FOR PRODUCING A COMPONENT COMPRISING AT LEAST ONE HOLLOW PROFILE

(75) Inventors: Ralph Arnold, Oldenburg (DE); Fred Eisenbeiss, Butjadingen (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 408 days.

(21) Appl. No.: 13/695,133

(22) PCT Filed: Apr. 23, 2011

(86) PCT No.: PCT/DE2011/000451
§ 371 (c)(1),
(2), (4) Date: Oct. 29, 2012

(87) PCT Pub. No.: WO2011/134459
PCT Pub. Date: Nov. 3, 2011

(65) Prior Publication Data
US 2013/0036595 A1    Feb. 14, 2013

(30) Foreign Application Priority Data
Apr. 29, 2010  (DE) .......................... 10 2010 018 726

(51) Int. Cl.
*B29C 70/54* (2006.01)
*B29C 70/74* (2006.01)

(52) U.S. Cl.
CPC ............... *B29C 70/545* (2013.01); *B29C 70/54* (2013.01); *B29C 70/742* (2013.01); *Y10T 29/49865* (2015.01); *Y10T 29/49867* (2015.01)

(58) Field of Classification Search
CPC ............................ B29C 70/545; B29C 70/54
USPC ................ 29/447, 557; 244/119, 120, 129.1, 244/123.1, 133; 264/407, 406; 73/632, 635, 73/618, 620–631
See application file for complete search history.

(56) References Cited

U.S. PATENT DOCUMENTS 4,053,667 A * 10/1977 Smith .......................... 428/36.1
4,246,794 A *  1/1981 Sheets et al. .................... 73/637
(Continued)

FOREIGN PATENT DOCUMENTS

| | | | | |
|---|---|---|---|---|
| DE | 102008044069.8 | * | 11/2008 | ............... F16S 3/02 |
| WO | WO 2008107461 A1 | * | 9/2008 | ............. G01N 29/14 |

OTHER PUBLICATIONS

Zotefoams; http://www.qualityfoam.com/docs/166_HD30.pdf; High Density Polyethylene Foam Property Data Sheet; Jan. 2004; pp. 1-2.*

(Continued)

*Primary Examiner* — Jermie Cozart
*Assistant Examiner* — Bayan Salone
(74) *Attorney, Agent, or Firm* — Leydig, Voit & Mayer, Ltd.

(57) ABSTRACT

A method for producing a component with at least one hollow profile from a fiber composite material includes producing a component blank from the fiber composite material. The component blank includes a hollow profile with open ends. The component blank is thermally treated. Each open end of the hollow profile is closed with a stopper that includes at least an outer circumference of a closed-pore foam. The thermally treated component blank is tested using ultrasound in accordance with a non-destructive material-testing method. The component blank is then mechanically treated so as to obtain a finished component and the stoppers are removed. Alternatively, the component blank is mechanically treated to obtain the finished product before the ultrasound testing.

20 Claims, 1 Drawing Sheet

(56) References Cited

U.S. PATENT DOCUMENTS

| | | | | |
|---|---|---|---|---|
| 4,299,921 A | * | 11/1981 | Youssef | 435/305.4 |
| 5,348,601 A | * | 9/1994 | Ray | 156/155 |
| 5,527,414 A | * | 6/1996 | Dublinski et al. | 156/245 |
| 5,533,224 A | * | 7/1996 | Knapp | 15/104.061 |
| 6,117,376 A | | 9/2000 | Merkel | 264/46.5 |
| 6,187,411 B1 | * | 2/2001 | Palmer | 428/102 |
| 6,458,309 B1 | * | 10/2002 | Allen et al. | 264/319 |
| 6,478,922 B1 | * | 11/2002 | Rosevear et al. | 156/297 |
| 6,484,583 B1 | * | 11/2002 | Chennell et al. | 73/623 |
| 6,497,190 B1 | * | 12/2002 | Lewit | 114/357 |
| 6,568,514 B1 | * | 5/2003 | Tokasz | 188/376 |
| 6,720,362 B1 | * | 4/2004 | Park | 521/79 |
| 6,887,912 B2 | * | 5/2005 | Malwitz et al. | 521/134 |
| 6,949,588 B2 | * | 9/2005 | Park | 521/79 |
| 7,074,474 B2 | * | 7/2006 | Toi et al. | 428/102 |
| 7,249,512 B2 | * | 7/2007 | Kennedy et al. | 73/618 |
| 7,263,889 B2 | * | 9/2007 | Kennedy et al. | 73/620 |
| 7,341,758 B2 | * | 3/2008 | Stewart et al. | 427/8 |
| 7,464,596 B2 | * | 12/2008 | Bui et al. | 73/618 |
| 7,690,259 B2 | * | 4/2010 | Bui et al. | 73/625 |
| 7,706,985 B2 | * | 4/2010 | Fogarty et al. | 702/39 |
| 7,861,969 B2 | * | 1/2011 | Guzman et al. | 244/120 |
| 7,871,040 B2 | * | 1/2011 | Lee et al. | 244/119 |
| 7,879,276 B2 | * | 2/2011 | Guzman et al. | 264/248 |
| 8,042,767 B2 | * | 10/2011 | Velicki et al. | 244/117 R |
| 8,185,327 B2 | * | 5/2012 | Fogarty et al. | 702/39 |
| 8,377,247 B2 | * | 2/2013 | Guzman et al. | 156/285 |
| 8,419,402 B2 | * | 4/2013 | Guzman et al. | 425/110 |
| 8,493,554 B2 | * | 7/2013 | Arnold | 356/4.01 |
| 8,500,066 B2 | * | 8/2013 | Lewis et al. | 244/119 |
| 8,617,687 B2 | * | 12/2013 | McCarville et al. | 428/117 |
| 2002/0178992 A1 | * | 12/2002 | Lewit | 114/357 |
| 2002/0184841 A1 | * | 12/2002 | Diamond | 52/203 |
| 2004/0176484 A1 | | 9/2004 | Park | 521/50 |
| 2005/0003145 A1 | * | 1/2005 | Toi et al. | 428/102 |
| 2005/0230552 A1 | * | 10/2005 | Engwall et al. | 244/133 |
| 2006/0162456 A1 | * | 7/2006 | Kennedy et al. | 73/620 |
| 2008/0111024 A1 | * | 5/2008 | Lee et al. | 244/121 |
| 2008/0248252 A1 | * | 10/2008 | Cassaro | 428/158 |
| 2008/0290214 A1 | * | 11/2008 | Guzman et al. | 244/119 |
| 2009/0127393 A1 | * | 5/2009 | Guzman et al. | 244/133 |
| 2011/0111183 A1 | * | 5/2011 | Guzman et al. | 428/188 |
| 2011/0272086 A1 | * | 11/2011 | Dittman et al. | 156/155 |
| 2011/0297325 A1 | * | 12/2011 | Maheshwari et al. | 156/500 |
| 2013/0004730 A1 | * | 1/2013 | Benson et al. | 428/174 |
| 2013/0344291 A1 | * | 12/2013 | Pearson et al. | 428/157 |

OTHER PUBLICATIONS

Zotefoams; http://www.qualityfoam.com/docs/148_LD15FM.pdf; Flame Retarded Low Density Polyethylene Foam Property Data Sheet; Jan. 2004; pp. 1-2.*

European Patent Office, International Search Report in International Patent Application No. PCT/DE2011/00451 (Nov. 17, 2011).

* cited by examiner

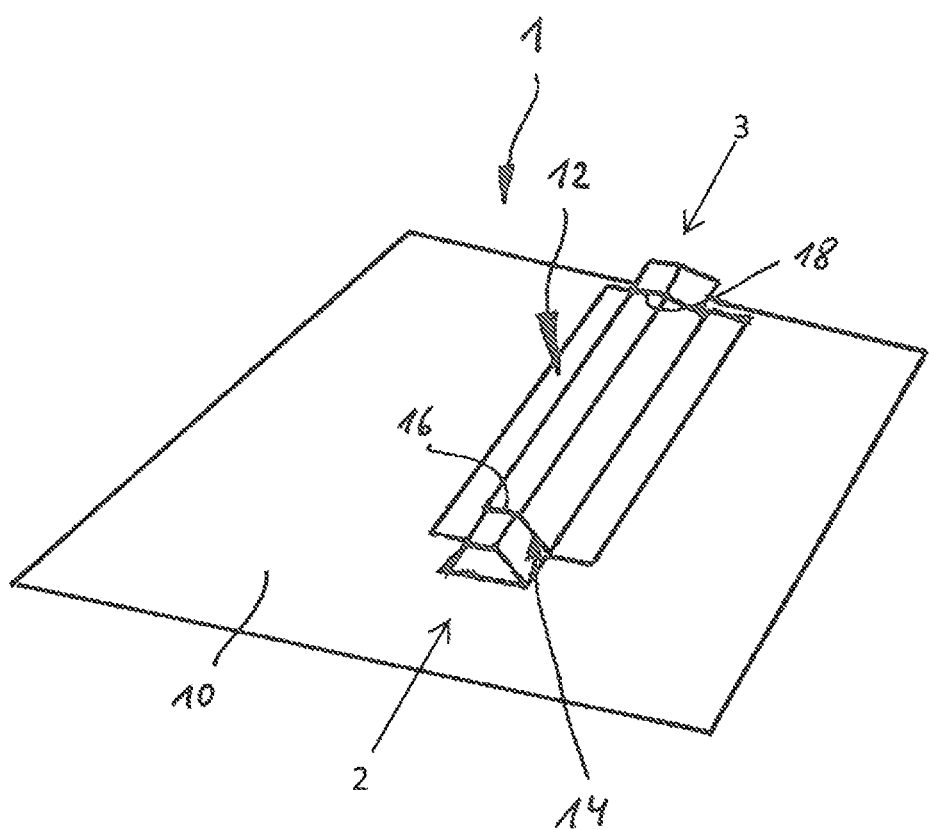

METHOD FOR PRODUCING A COMPONENT COMPRISING AT LEAST ONE HOLLOW PROFILE

CROSS REFERENCE TO RELATED APPLICATIONS

This application is a U.S. National Phase application under 35 U.S.C. §371 of International Application No. PCT/DE2011/000451, filed on Apr. 23, 2011, and claims benefit to German Patent Application No. DE 10 2010 018 726.7, filed on Apr. 29, 2010. The International Application was published in German on Nov. 3, 2011 as WO 2011/134459A1 under PCT Article 21 (2).

FIELD

The present invention relates to a method for producing a component provided with at least one hollow profile from a fibre composite material.

BACKGROUND

During processing of aircraft fuselage panels made of a carbon fibre reinforced plastics material, contamination by chips or abrasive agents is caused by processing steps such as grinding or milling and the water jet cutting process. Contaminants of this type penetrate in particular into hollow spaces of hollow profiles, which are formed on the aircraft fuselage panel for example by what are known as stringers. Cleaning and drying said stringers after said component blank of an aircraft fuselage panel has been mechanically processed is very time consuming and expensive. Therefore, it is desirable for the open ends of said hollow spaces to be closed and sealed before the mechanical processing step.

If this sealing takes place after the component blank is thermally treated, therefore, when said blank is removed for example from the autoclave, in the case of materials hitherto known for this purpose for closure stoppers for sealing the opens ends of the hollow profile, problems arise when the component blank is tested by means of ultrasound, which takes after the thermal processing, since the boundary between the component wall and the stopper does not make it possible for any ultrasound to be effectively reflected. The material hitherto available for stoppers of this type absorbed the ultrasound. In order for it to be possible to carry out reliable material testing of the component blanks, it was therefore previously necessary to insert the stoppers into the open ends of the hollow profile in an additional handling step after the material testing step by means of ultrasound, and this was very time-consuming.

SUMMARY

In an embodiment, the present invention provides

BRIEF DESCRIPTION OF THE DRAWINGS

Exemplary embodiments of the present invention are described in more detail below, with reference to the drawings, in which:

FIG. 1 shows a component blank made of a carbon fibre reinforced plastics material having a hollow profile which is closed by a stopper according to the invention at the open end which is visible in the drawing.

DETAILED DESCRIPTION

In an embodiment, the present invention provides a generic method which makes it possible for each open end of the hollow profile to be closed by a stopper without additional handling of the component blank and without the non-destructive material testing of the component blank by means of ultrasound being affected.

In an embodiment, the present invention also provides a stopper which is suitable for a method of this type.

A method for producing a component provided with at least one hollow profile from a fibre composite material is achieved by a method comprising the steps of:

a) producing a component blank from the fibre composite material;

b) thermally treating the component blank;

c) closing each open end of the hollow profile by means of a stopper;

d) testing the thermally treated component blank by means of ultrasound in accordance with a non-destructive material-testing method;

e) mechanically processing the component blank in order to obtain the finished component;

f) removing the stoppers;

wherein each stopper consists of a closed-pore foam or at least comprises said foam over the outer circumference thereof.

Alternatively, the step of mechanical processing can also be carried out directly after closing the open ends, the finished component then being subjected to the non-destructive material testing.

Since the order of steps d) and e) is therefore interchangeable, an embodiment of the invention also provides a method comprising the steps of:

a) producing a component blank (1) from the fibre composite material;

b) thermally treating the component blank (1);

c) closing each open end (16, 18) of the hollow profile (14) by means of a stopper (2, 3);

d') mechanically processing the component blank (1) in order to obtain the finished component;

e') testing the finished component by means of ultrasound in accordance with a non-destructive material-testing method;

f) removing the stoppers (2, 3);

wherein each stopper (2, 3) consists of a closed-pore foam or at least comprises said foam over the outer circumference thereof.

The use of a stopper made of an ultrasound-reflecting material, such as a closed-pore foam, in which the stopper comprises said ultrasound-reflecting material at least over the outer circumference thereof or even consists substantially entirely of this material, makes it possible to insert the stopper(s) after thermal treatment of the component blank. At this point, the component blank has to be removed manually from the autoclave or from a corresponding heating device and moulded cores have to be removed manually. During this manual handling of the component blank, it is not very difficult to insert stoppers, the outer contour thereof being adapted to the inner contour of the hollow profile, into the open ends of the hollow profile and thus to seal said hollow profile. The component blank can then continue to be processed by testing the thermally treated component blank by means of ultrasound according to a non-destructive material-testing method. The material properties according to the invention of the stopper used here ensure that the ultrasound oscillations are not absorbed by the stopper but are reflected by the surface thereof, in such a way that the material boundary between the wall material of the component blank and the stopper material is clearly detectable by the ultrasound measurement apparatus used for material testing. These advantages cannot be achieved by stoppers made of resilient or soft foam. Only by using the claimed stoppers is it possible to carry out the method steps in the claimed order and to omit an additional handling step.

The stoppers according to embodiments of the invention tightly seal the open end of the hollow profile and thus prevent dust, water and other foreign bodies from penetrating during the step of mechanically processing the component blank. These stoppers according to the invention can be removed from the open ends of the hollow profile after mechanical processing with no problems and leaving no residue.

The foam of the stopper is preferably made of polyethylene or predominantly comprises polyethylene. Tests by the inventor have shown that polyethylene foam is particularly suitable for carrying out the method according to the invention.

It is also advantageous for the foam of the stopper to have a density of 30 kg/m3 at most, preferably of between 10 kg/m3 and 20 kg/m3, more preferably of less than 18 kg/m3 and most preferably of 15 kg/m3. Foams of this density are particularly suitable for carrying out the method according to the invention and effectively ensure the desired reflection of the ultrasound waves at the boundaries with a high sealing effect being able to be simultaneously achieved.

It is also particularly advantageous for the foam of the stopper to have a pore size of 2 mm at most, preferably of between 0.3 mm and 1.5 mm, and more preferably of between 0.6 mm and 1.2 mm. These pore sizes ensure both a high strength of the foam and also the desired capacity for reflection of the stopper surface formed by the foam for ultrasound oscillations.

The method is advantageous if the fibre composite material is carbon fibre reinforced plastics material.

A method according to an embodiment of the invention is particularly suitable if the mechanical processing of the component blank includes machining, such as sawing, milling, grinding, planing and/or cutting, such as water jet cutting. These processing methods produce a particularly large amount of contaminants, which are prevented from entering the hollow profiles by attaching stoppers according to the invention.

A stopper which consists of a closed-pore foam or at least comprises said foam over the outer circumference thereof is particularly suitable for carrying out the method according to the invention.

This stopper preferably has the material properties which are mentioned above with respect to the method.

FIG. 1 is a simplified perspective view of a component blank 1 for a component made of a fibre composite material. In the case shown, this is a panel of an aircraft fuselage made of carbon fibre reinforced plastics material. The component blank comprises a surface element 10 which subsequently forms part of the fuselage skin of the aircraft. A longitudinal support 12, what is known as an omega stringer, having a curved cross-section is attached to the upper side (the subsequent inside of the fuselage) of the surface element 10 and is connected to said surface element 10. After connection, that is to say after production of the component blank 1 from the fibre composite material, the surface element 10 and the longitudinal support 12 are thermally treated. This thermal treatment is preferably carried out under the influence of negative pressure in order to remove from the material gases which develop in the plastics material during curing and thus to prevent gas pockets from forming in the material. Conventional thermal treatment takes place for example in an autoclave.

After the step of thermally treating the component blank 1 is complete, the surface element 10 and the longitudinal support 12 are rigidly interconnected, in such a way that the longitudinal support 12 forms a hollow profile 14 together with the portion of the surface element 10 which is adjacent thereto, which hollow profile is open at the two ends 16, 18 thereof.

If the component blank 1 is removed from the device for thermal treatment, then moulded cores first have to be removed manually. The component blank 1 then undergoes further processing, in which the thermally treated component blank 1 is initially subjected to non-destructive material testing by means of ultrasound. Then the component blank 1 is mechanically processed, the component blank being cut to the required dimensions of the component to be manufactured and the cutting edges being sanded down.

However, before this further processing begins, at the point at which the component blank 1 has been removed from the device for thermal treatment and the moulded cores have been removed, a stopper 2, 3 made of a closed-pore foam, in particular a foam which is soft and flexible in the manner of a foam material, is inserted in a sealing manner into each opening formed at the open ends 16, 18 of the hollow profile 14 in such a way that the hollow profile 14 is completely closed and no foreign bodies or liquid can enter the hollow profile 14.

Each stopper 2, 3 is either formed completely from a closed-pore foam or has a core which is surrounded by the closed-pore foam, in such a way that the closed-pore foam forms the outer circumference of the stopper 2, 3. The closed-pore property of the foam ensures that the ultrasound waves, which are emitted during the non-destructive material testing by a corresponding testing apparatus, cannot enter the foam of the stopper 2, 3 and be absorbed there, but are reflected at the surface thereof. In this way, it is possible, during the non-destructive material testing by means of ultrasound, not only to obtain a clear reflection signal of the ultrasound upon entering the wall of the component blank, but also to obtain a reflection signal at the boundary between the wall of the component blank 1 and the surface of the stopper 2, 3.

During mechanical processing of the component blank 1, the stoppers 2, 3 ensure that neither chips nor abraded particles, which are produced by the mechanical processing of the component blank 1, or water or other liquids used when cutting the component blank 1 are able to penetrate into the inside of the hollow profile 14. In this way, contrary to the conventional processing approach in which the hollow profile remains open, a complex cleaning and drying step of the finished component is omitted. After the component blank 1 has been mechanically processed, the stoppers 2, 3 are removed and the finished component obtained can undergo further processing, for example coating.

The order, described in the example, of the steps for the non-destructive material testing and mechanical processing is not compulsory; mechanical processing can also take place before the non-destructive material testing. It is essential that the openings in the component blank 1 are closed by the stoppers 2, 3 at the point of mechanical processing, and said stoppers then also remain in the openings during the non-destructive material testing.

Reference numerals in the claims, description and drawings serve only to provide a better understanding of the invention and should not limit the scope of protection.

LIST OF REFERENCE NUMERALS

1 Component blank
2 Stopper
3 Stopper
10 Surface element

12 Longitudinal support
14 Hollow profile
16 Open end of the hollow profile
18 Open end of the hollow profile

The invention claimed is:

1. A method for producing a component including at least one hollow profile from a fiber composite material, the method comprising:
   a) producing a component blank from the fiber composite material, the component blank including a hollow profile with open ends;
   b) thermally treating the component blank;
   c) after removing a core from the component blank, closing each open end of the hollow profile with a stopper, each stopper including at least an outer circumference of a closed-pore foam;
   d) testing the thermally treated component blank using ultrasound in accordance with a non-destructive material-testing method while each open end of the hollow profile is closed with the stopper;
   e) mechanically processing the component blank so as to obtain a finished component; and
   f) removing the stoppers.

2. The method recited in claim 1, wherein the foam of the stoppers is polyethylene.

3. The method recited in claim 1, wherein the foam of the stoppers is predominantly polyethylene.

4. The method recited in claim 1, wherein the foam of the stoppers has a density no greater than 30 kg/m$^3$.

5. The method recited in claim 4, wherein the foam of the stoppers has a density in a range of 10 kg/m$^3$ to 20 kg/m$^3$.

6. The method recited in claim 1, wherein the foam of the stoppers has a size no greater than 2 mm.

7. The method recited in claim 6, wherein the foam of the stoppers has a size in a range of 0.6 mm to 1.2 mm.

8. The method recited in claim 1 wherein the fiber composite material is a carbon fiber reinforced plastics material.

9. The method recited in claim 1, wherein the mechanical processing includes machining.

10. The method recited in claim 9, wherein the machining includes at least one of sawing, milling, grinding, planing or cutting.

11. A method for producing a component including at least one hollow profile from a fiber composite material, the method comprising:
    a) producing a component blank from the fibre composite material, the component blank including a hollow profile with open ends;
    b) thermally treating the component blank;
    c) after removing a core from the component blank, closing each open end of the hollow profile with a stopper, each stopper including at least an outer circumference of a closed-pore foam;
    d) mechanically processing the component blank so as to obtain a finished component;
    e) testing the finished component using ultrasound in accordance with a non-destructive material-testing method while each open end of the hollow profile is closed with the stopper; and
    f) removing the stoppers.

12. The method recited in claim 11, wherein the foam of the stoppers is polyethylene.

13. The method recited in claim 11, wherein the foam of the stoppers is predominantly polyethylene.

14. The method recited in claim 11, wherein the foam of the stoppers has a density no greater than 30 kg/m$^3$.

15. The method recited in claim 14, wherein the foam of the stoppers has a density in a range of 10 kg/m$^3$ to 20 kg/m$^3$.

16. The method recited in claim 11, wherein the foam of the stoppers has a size no greater than 2 mm.

17. The method recited in claim 16, wherein the foam of the stoppers has a size in a range of 0.6 mm to 1.2 mm.

18. The method recited in claim 11 wherein the fiber composite material is a carbon fiber reinforced plastics material.

19. The method recited in claim 11, wherein the mechanical processing includes machining.

20. The method recited in claim 19, wherein the machining includes at least one of sawing, milling, grinding, planing or cutting.

* * * * *